US010295763B2

(12) United States Patent
Ho et al.

(10) Patent No.: US 10,295,763 B2
(45) Date of Patent: May 21, 2019

(54) TECHNIQUES FOR INDIRECT OPTICAL COUPLING BETWEEN AN OPTICAL INPUT/OUTPUT PORT OF A SUBASSEMBLY HOUSING AND AN ARRAYED WAVEGUIDE GRATING (AWG) DEVICE DISPOSED WITHIN THE SAME

(71) Applicant: Applied Optoelectronics, Inc., Sugar Land, TX (US)

(72) Inventors: I-Lung Ho, Sugar Land, TX (US); Luohan Peng, Cypress, TX (US); Kai-Sheng Lin, Sugar Land, TX (US); Elsie Marentes, Katy, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/613,655

(22) Filed: Jun. 5, 2017

(65) Prior Publication Data

US 2018/0348456 A1 Dec. 6, 2018

(51) Int. Cl.

| | |
|---|---|
| ***G02B 6/12*** | (2006.01) |
| ***G02B 6/42*** | (2006.01) |
| ***G02B 6/125*** | (2006.01) |
| ***G02B 6/38*** | (2006.01) |
| ***H04B 10/40*** | (2013.01) |

(52) U.S. Cl.

CPC ........... *G02B 6/4246* (2013.01); *G02B 6/125* (2013.01); *G02B 6/3897* (2013.01); *G02B 6/4256* (2013.01); *H04B 10/40* (2013.01); *G02B 2006/12164* (2013.01)

(58) Field of Classification Search

CPC .. G02B 6/4246; G02B 6/3897; G02B 6/4256; G02B 6/125; G02B 2006/12164; H04B 10/25; H04B 10/50; H04B 10/40

See application file for complete search history.

(56) References Cited

U.S. PATENT DOCUMENTS 9,039,303 B2 * 5/2015 Wang .................... H04B 10/40 385/147
9,341,786 B1 5/2016 Gamache et al.
(Continued)

OTHER PUBLICATIONS

PCT Search Report—Written Opinion dated Sep. 22, 2017, received in related PCT Application No. PCT/US17/47569, 9 pgs.

(Continued)

*Primary Examiner* — Ellen E Kim

(74) *Attorney, Agent, or Firm* — Grossman Tucker Perreault & Pfleger, PLLC; Norman S. Kinsella

(57) ABSTRACT

Techniques for flexible coupling between an optical coupling receptacle/port of an optical transceiver housing and optical components within the same are disposed. In an embodiment, an optical transceiver housing includes an intermediate fiber with a first end optically coupled to an optical coupling port and a second end optically coupled to a multiplexer/de-multiplexer device, e.g., an arrayed waveguide grating (AWG) device, PLC splitter, and so on. The intermediate fiber may be routed in the transceiver housing in a manner that and the radius of the bends may be optimized to reduce fiber bending losses. The techniques herein are equally applicable to both ROSA and TOSA modules and may be utilized to achieve flexible coupling for multi-channel transceiver devices.

19 Claims, 4 Drawing Sheets

(56) References Cited

U.S. PATENT DOCUMENTS

| | | | | |
|---|---|---|---|---|
| 9,419,717 | B2* | 8/2016 | Huang | G01J 1/0271 |
| 9,455,782 | B2* | 9/2016 | Zheng | H04B 10/07955 |
| 9,553,671 | B1* | 1/2017 | Nagarajan | H04B 10/40 |
| 2008/0056644 | A1 | 3/2008 | Naka et al. | |
| 2011/0058771 | A1* | 3/2011 | Lee | G02B 6/4215 385/33 |
| 2012/0092756 | A1* | 4/2012 | Yoshida | B32B 27/06 359/351 |
| 2013/0071072 | A1* | 3/2013 | Xie | G02B 6/4277 385/92 |
| 2014/0241726 | A1* | 8/2014 | Ho | H01S 3/04 398/70 |
| 2016/0377822 | A1* | 12/2016 | Zheng | H04J 14/02 385/14 |
| 2017/0131492 | A1* | 5/2017 | Vallance | G02B 6/4251 |
| 2017/0168252 | A1* | 6/2017 | Pezeshki | G02B 6/4246 |

OTHER PUBLICATIONS

U.S. Office Action dated Jun. 16, 2017, received in related U.S. Appl. No. 15/242,005, 9 pgs.

U.S. Office Action dated Jan. 8, 2018, received in related U.S. Appl. No. 15/242,005, 14 pgs.

PCT Search Report and Written Opinion dated Jul. 10, 2018, received in corresponding PCT Application No. PCT/US18/36057, 12 pgs.

* cited by examiner

TECHNIQUES FOR INDIRECT OPTICAL COUPLING BETWEEN AN OPTICAL INPUT/OUTPUT PORT OF A SUBASSEMBLY HOUSING AND AN ARRAYED WAVEGUIDE GRATING (AWG) DEVICE DISPOSED WITHIN THE SAME

TECHNICAL FIELD

The present disclosure relates to optical transmitters and transceivers, and more particularly, to techniques for utilizing a single fiber to optically couple an output/input optical port of a subassembly housing to optical components within the same in order to allow for flexible position of the output/input optical port relative to the optical components.

BACKGROUND INFORMATION

Optical transceivers are used to transmit and receive optical signals for various applications including, without limitation, internet data centers, cable TV broadband, and fiber to the home (FYI H) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, insertion loss, and manufacturing yield.

Optical transceivers can include one or more transmitter optical subassemblies (TOSAs) and receiver optical subassemblies (ROSAs) for the purpose of transmitting and receiving optical signals. As channel density becomes an increasingly important aspect of optical transceivers, the ability scale-down while maintaining nominal transceiver performance raises numerous non-trivial challenges.

BRIEF DESCRIPTION OF THE DRAWINGS

These and other features and advantages will be better understood by reading the following detailed description, taken together with the drawings wherein.

DETAILED DESCRIPTION

Figure 2:
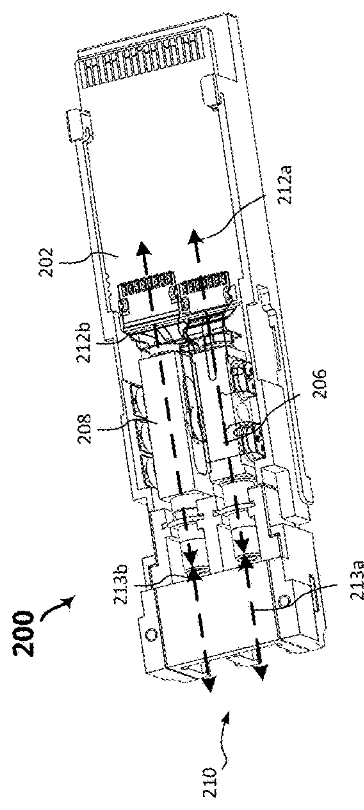
FIG. 2 is a perspective view of an optical transceiver having a multi-channel TOSA and multi-channel ROSA directly coupled to optical coupling ports to couple to external transmit fibers.

Optical transceiver devices generally include a housing with various optical components, e.g., receiver optical subassembly (ROSA) modules and transmitter optical subassembly (TOSA) modules, disposed therein for launching and receiving channel wavelengths, and an optical input/output port for optically coupling the optical components to an external transmit and/or receive fiber. The particular position of the input/output ports may be governed by a particular standard. For instance, as shown in FIG. 2, the optical transceiver 200 implements a small-form factor plugging SFFP architecture which includes a pair of optical ports 210, e.g., LC ports, disposed at an end of the housing 202. The particular position of the optical ports 210 limits the position of a multi-channel TOSA 206 and a multi-channel ROSA 208, which are disposed in different sections of the housing 202. For instance, given the space constraints of the housing 202, each of the multi-channel TOSA 206 and ROSA 208 are disposed directly adjacent ports 210 and each include an optical center line, e.g., optical center lines 212*a*, 212*b*, that is coaxial with the optical center line, e.g., optical center line 213*a*, 213*b*, of a respective optical port. Disposing the TOSA 206 and ROSA 208 directly adjacent and co-linear with the ports 210, as shown, ensures that the position of the optical ports comport with a particular standard and that the performance of the optical transceiver meets nominal power requirements. Unfortunately, direct optical coupling in this manner significantly limits the position of the TOSA 206 and ROSA 208 within the housing 202.

Thus, in accordance with an embodiment of the present disclosure, techniques for flexible coupling between an optical coupling receptacle/port of an optical transceiver housing and optical components within the same are disposed. In an embodiment, an optical transceiver housing includes an intermediate fiber with a first end optically coupled to an optical coupling port and a second end optically coupled to a multiplexer/de-multiplexer device, e.g., an arrayed waveguide grating (AWG) device, PLC splitter, and so on. The intermediate fiber may be routed in the transceiver housing in a manner that introduces one or more bends, and the radius (also known as a bending radius) of the bends may be optimized to reduce fiber bending losses. The techniques herein are equally applicable to both ROSA and TOSA modules and may be utilized to achieve flexible coupling for multi-channel transceiver devices.

In one specific example embodiment, an optical transceiver device includes a TOSA housing portion and a ROSA housing portion. Each of the TOSA and ROSA housing portions may be configured to couple together to collectively form a transceiver device. Each of the TOSA and ROSA housing portions may be associated with an optical coupling receptacle/port to optically couple respective TOSA and ROSA assemblies to an associated optical coupling ports. In this embodiment, the TOSA may include a multiplexing device with a plurality of input ports for receiving different channel wavelengths from laser assemblies and a single output port for outputting a signal having multi-channel wavelengths. The multiplexing device may be located at a distal end of the transceiver housing relative to the optical coupling ports. A single fiber may couple to the output port of the multiplexing device and be routed through the transceiver housing to optically couple to a respective optical output port of the transceiver housing. Thus, the optical output port of the transceiver housing and the output port of the multiplexing device need not be in close proximity nor have their respective optical center lines be co-axial with each other. Likewise, a ROSA module of the ROSA housing portion may be optically coupled to a respective input optical port of the transceiver housing by way of an intermediate fiber. Accordingly, the position of the ROSA module need not be directly adjacent and/or in a co-axial configuration with the optical input port of the optical transceiver housing.

Utilizing a single intermediate fiber to couple a TOSA and/or ROSA module to a respective optical port provides numerous advantages. For example, optical components such as laser assemblies, multiplexing devices, demultiplexing devices may be disposed within the optical transceiver housings at a variety of locations independent of that of respective optical coupling ports of the optical transceiver housing. This allows for TOSA and ROSA modules to be disposed in separate portions of a transceiver housing to optimize usable space.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T course wavelength division multiplexing (CWDM) or dense wavelength division multiplexing (DWDM) grid. As used herein, "mounted" refers to physically attaching two structures together, for example, by welding or using an epoxy or other substance or device for attachment. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. Likewise, the term "directly coupled" or "directly optically coupled" as used herein refers any optical connection that allows light to be imparted from one element to another without the use of an intermediate device such as a fiber.

Figure 1:
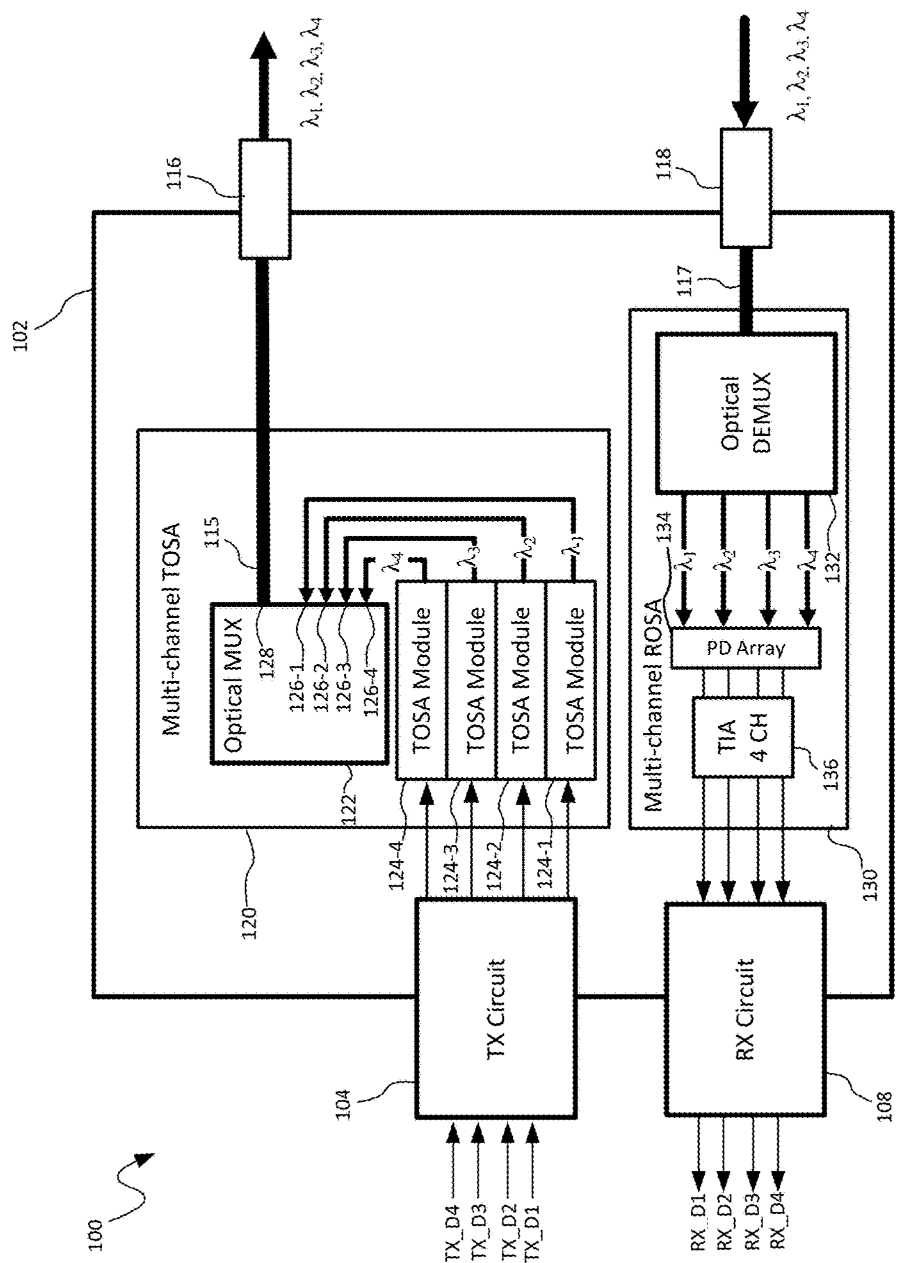
FIG. 1 is a schematic diagram of a multi-channel optical transceiver including a multi-channel transmitter optical sub-assembly (TOSA) and multi-channel receiver optical sub-assembly (ROSA), consistent with embodiments of the present disclosure.

Referring to FIG. 1, an optical transceiver 100, consistent with embodiments of the present disclosure, is shown and described. In this embodiment, the optical transceiver 100 transmits and receives four (4) channels using four different channel wavelengths ($\lambda$1, $\lambda_2$, $\lambda_3$, $\lambda_1$) and may be configured for coarse wavelength division multiplexing (CWDM), although other numbers of channels are possible and within the scope of this disclosure. In one example, the channel wavelengths $\lambda_1$, $\lambda_2$, $\lambda_3$, $\lambda_4$ may be about 1270 nm, 1290 nm, 1310 nm, and 1330 nm, respectively. The optical transceiver 100 may be capable of transmission rates of at least about 25 Gbps per channel. The optical transceiver 100 may also be capable of both short transmission distances of tens of meters, for example, to distances of 2 kilometers or more. The optical transceiver 100 may be used, for example, in internet data center applications or fiber to the home (FFTH) applications.

In an embodiment, the optical transceiver 100 implements a Quad Small Form-Factor Plugging (QSFP) transceiver. For example, the optical transceiver 100 may be implemented within a QSFP receiver that comports with the "SFF Committee Specification SFF-8665 for QSFP+28 Gb/s 4× Pluggable Transceiver Solution (QSFP28)" published on May 10, 2013. The aspects and embodiments disclosed herein may be used within other transceiver types and is not necessarily limited to QSFP or QFSP+ transceivers.

The optical transceiver 100 includes a multi-channel transmitter optical subassembly (TOSA) 120 for transmitting optical signals on the channel wavelengths (e.g., $\lambda_1$, $\lambda_2$, $\lambda_3$, $\lambda$1) and a multi-channel receiver optical subassembly (ROSA) 130 for receiving optical signals on the channel wavelengths (e.g., $\lambda_1$, $\lambda_2$, $\lambda_3$, $\lambda$4). The multi-channel TOSA 120 and the multi-channel ROSA 130 are located in a transceiver housing 102. A transmit connecting circuit 104 and a receive connecting circuit 108 provide electrical connections to the multi-channel TOSA 120 and the multi-channel ROSA 130, respectively, within the housing 102. The transmit connecting circuit 104 is electrically connected to the electronic components (e.g., the lasers, monitor photodiodes, etc.) in the multi-channel TOSA 120 and the receive connecting circuit 108 is electrically connected to the electronic components (e.g., the photodiodes, the TIA, etc.) in the multi-channel ROSA 130. The transmit connecting circuit 104 and the receive connecting circuit 108 include at least conductive paths to provide electrical connections and may also include additional circuitry. The transmit connecting circuit 104 and the receive connecting circuit 108 may communicate with external systems via a data bus, such as a 38-pin connector that comports with physical connector QSFP standards and data communication protocols.

In this embodiment, the TOSA 120 includes a plurality of TOSA modules 124-1 to 124-4 optically coupled to an optical multiplexer 122 having mux input ports 126-1 to 126-4 and mux output port 128 on the same side. One example of an optical multiplexer having mux input ports and a mux output port on the same side is described in greater detail in U.S. Patent Application Publication No. 2018-0017745 (Ser. No. 15/210,193), which is commonly owned and incorporated herein by reference.

The TOSA modules 124-1 to 124-4 may be coupled to the mux input ports 122-1 to 122-4 of the optical multiplexer 122 using optical fibers. The optical multiplexer 122 may be an arrayed waveguide grating (AWG) or a reversed PLC splitter. One example of a reversed PLC splitter used as an optical multiplexer is described in greater detail in U.S. Patent Application Publication No. 2017-0359126 (Ser. No. 15/176,404), which is commonly owned and incorporated herein by reference. The reversed PLC splitter has the additional advantage of being wavelength independent and thus may be less susceptible to wavelength drift (e.g., caused by temperature changes).

Although the optical multiplexer 122 is shown adjacent the TOSA modules 124-1 to 124-4 in this schematic diagram, the optical multiplexer 122 may be located at a distal end of the transceiver housing 102 away from the TOSA modules 124-1 to 124-4, as described in greater detail below. The TOSA modules 124-1 to 124-4 generate optical signals at different respective channel wavelengths (e.g., $\lambda$1, $\lambda$2, $\lambda_3$, $\lambda_4$) and the optical multiplexer 122 combines or multiplexes those optical signals to provide a multiplexed optical signal on the mux output port 128 coupled to an output optical fiber 115. The output optical fiber 115 is coupled to an output optical connector 116, such as an LC connector.

Each of the TOSA modules 124-1 to 124-4 may have a coaxial configuration such that the TOSA module is electrically connected at one end to conductive paths on the transmit connecting circuit 104 and optically coupled at the other end. Each of the TOSA modules 124-1 to 124-4 may be indirectly aligned, e.g., off-axis, with the output optical connector 116, and optically coupled to the same via an intermediate fiber. As discussed in further detail below, this allows the TOSA modules 124-1 to 124-4 to be disposed in variety of locations within the housing 102 without necessarily being directly aligned with the output optical connector 116.

Continuing on, each of the TOSA modules 124-1 to 124-4 may include a laser for generating laser light at the assigned channel wavelength and optics for coupling the laser light into the respective mux input ports of the optical multiplexer 122. The lasers in the TOSA modules 124-1 to 124-4 thus convert electrical data signals (TX_D1 to TX_D4) received via the transmit connecting circuit 104 into modulated optical signals coupled into the optical multiplexer 122. The lasers may include, for example, distributed feedback (DFB) lasers with diffraction gratings. Each of the TOSA modules 124-1 to 124-4 may also include a monitor photodiode for monitoring the light emitted by the lasers. Each of the TOSA modules 124-1 to 124-4 may further include one or more temperature control devices, such as a resistive heater and/or a thermoelectric cooler (TEC), for controlling a temperature of the lasers, for example, to control or stabilize the laser wavelengths.

In this embodiment, the multi-channel ROSA 130 includes an optical demultiplexer 132 coupled to a photodetector array 134 including, for example, photodiodes. The optical demultiplexer 132 demultiplexes or separates a multiplexed optical signal received on an input optical fiber 117 to provide received optical signals at different channel wavelengths, which are detected by respective photodetectors in the photodetector array 134. The input optical fiber 117 is coupled to an input optical connector 118, such as an LC connector. The multi-channel ROSA 130 also includes a multi-channel transimpedance amplifier 136 electrically connected to the photodetector array 134. The photodetector array 134 and the transimpedance amplifier 136 detect and convert optical signals received from the optical demultiplexer 132 into electrical data signals (RX_D1 to RX_D4) that are output via the receive connecting circuit 108.

Although one example of the multi-channel ROSA 130 is described, the optical transceivers 100 may include other types or embodiments of ROSAs. In other embodiments, a multi-channel optical transmitter may include the transmit circuit 104, multi-channel TOSA 120, and output optical connector 116 (i.e., the transmitting portion) without the receive circuit 108, multi-channel ROSA 130, and input optical connector 118 (i.e., the receiving portion). The multi-channel ROSA 130 may be indirectly aligned, e.g., off-axis, relative to the input optical connector 118, and optically coupled to the same via an intermediate fiber. As discussed in further detail below, this may allow the multi-channel ROSA 130 to be disposed in variety of locations within the housing 102 and not necessarily directly aligned with the input optical connector 118.

Figure 3A:
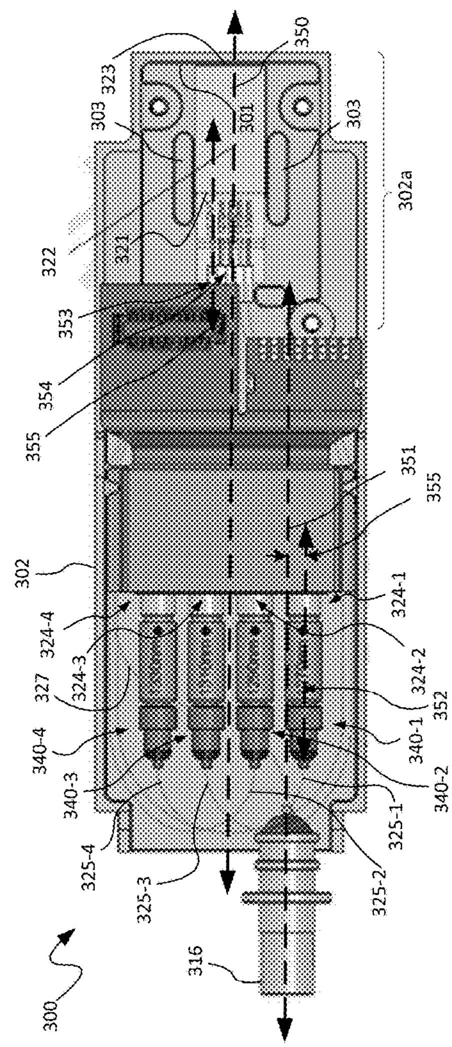
FIG. 3A is a top view of an embodiment of a transmitter portion of a multi-channel transceiver including an optical output port indirectly coupled to a fiber array of a multiplexing device via an intermediate fiber, consistent with the present disclosure.
Figure 3B:
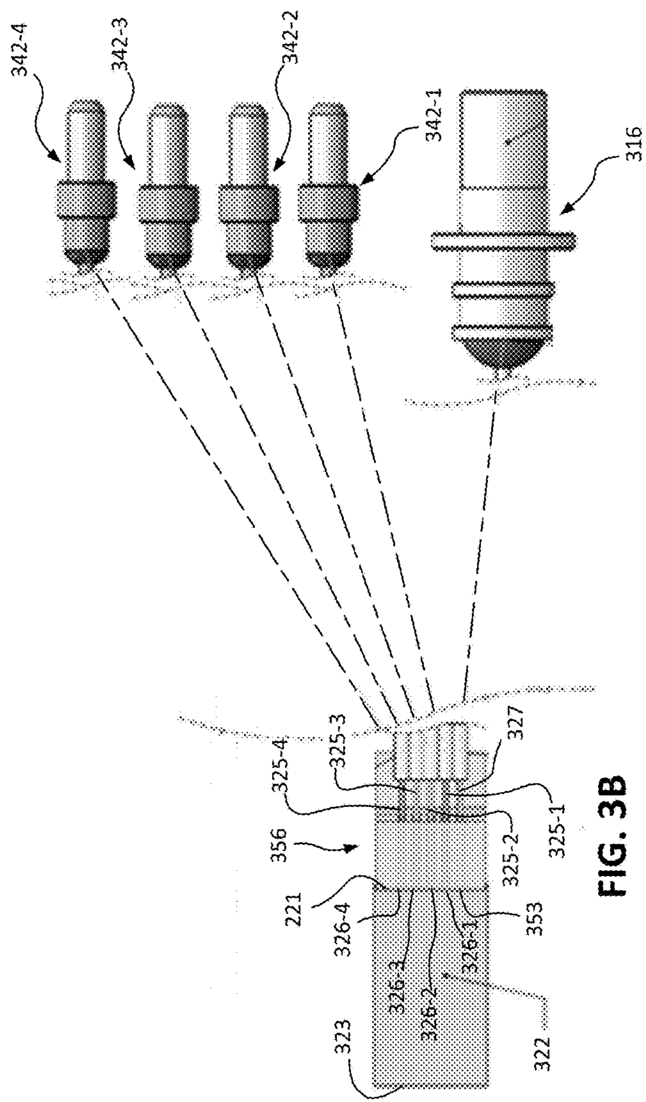
FIG. 3B is a top view of the optical multiplexer shown in FIG. 3A optically coupled to input optical fibers and an output optical fiber, consistent with the present disclosure.
Figure 3C:
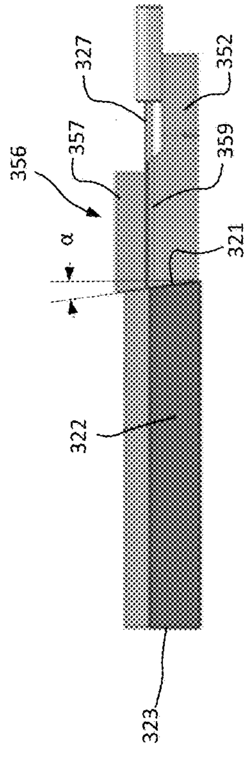
FIG. 3C is a side view of the optical multiplexer shown in FIG. 3A, in accordance with an embodiment of the present disclosure.

Referring to FIGS. 3A-3C, a transmitting portion of one embodiment of a multi-channel optical transceiver 300 is shown and described in greater detail. The optical transceiver 300 includes a transceiver housing 302 that houses TOSA components and ROSA components (not shown). In this embodiment, an optical output port 316, e.g., an LC connector, extends substantially in parallel with a longitudinal axis 350 of the housing 302. The TOSA modules 324-1 to 324-4 and optical multiplexer 322 may also extend substantially in parallel with the longitudinal axis 350, although this disclosure is not necessarily limited in this regard.

Further, the optical multiplexer 322 with mux input ports and an output port on one side is located at a distal end 302*a* of the transceiver housing 302. In the illustrated embodiment, the optical multiplexer 322 is abutting a distal wall 301 of the transceiver housing 302. In other embodiments, the optical multiplexer 322 may be adjacent the distal wall 301 without abutting the distal wall 301. The optical multiplexer 322 may be secured between structures 303 extending from the housing 302.

Continuing on with FIG. 3A, the optical output port 316, or optical output receptacle 316, includes an optical center line (shown generally extending along longitudinal axis 351) that is laterally offset by an offset distance D from an optical center of each of the TOSA modules 324-1 to 324-4, and more particularly TOSA optical coupling modules 340-1 to 340-4. For instance, the optical center of TOSA module 324-1 includes an offset 355 relative to that of the optical center line of the optical output port 316. In some cases, each offset measures at least 2 millimeters. In addition, the optical center line of the optical output port 316 may be laterally offset relative to an optical center line 355 of the mux output port 353 of the optical multiplexer 322. Likewise, each of the optical center lines of the TOSA modules 324-1 to 324-4 may be offset relative to the optical center line of each corresponding mux input port, which are generally shown at 354.

Continuing with FIG. 3A, optical fiber 327 includes a first end optically coupled the optical output port 316 and a second end optically coupled to the mux output port 353 of the optical multiplexer 322 within the housing 302. Likewise, optical fibers 325-1 to 325-4 include a first end optically coupled to a respective TOSA module 324-1 to 324-4 and a second end optically coupled to a respective mux input port generally shown at 355. The optical output port 316 may therefore be accurately referred to as indirectly coupled to the multiplexer device 322. This may advantageously allow the optical output port 316 to flexibly couple to the fiber array, e.g., fibers 325-1 to 325-3, of the multiplexer device 322, without concern for the exact position of the optical output port 316 relative to the optical multiplexer device 322 and/or the TOSA modules 324-1 to 324-4.

Continuing with FIG. 3A, the optical multiplexer 322 includes a plurality of mux input ports 354, which are individually shown as 326-1 to 326-4 in FIG. 3B, and a mux output port 354 all on the same side 321 (herein referred to as the optical coupling side). As shown in FIG. 3A, the distal side 323 of the optical multiplexer 322 (e.g., opposite the optical coupling side 321) is adjacent to or abutting the distal wall 301 of the transceiver housing 302, and the optical coupling side 321 is directed toward the other TOSA components in the transceiver housing 302. This arrangement facilitates optical coupling with the optical multiplexer 322 using optical fibers 325-1 to 325-4, and optical fiber 327 without unnecessary bends in the optical fibers which may advantageously reduce fiber bending losses.

The optical multiplexer 322 may be an arrayed waveguide grating (AWG) with the input ports and output port on the same side or facet of the AWG chip. The optical multiplexer 322 may also be a reversed planar lightwave circuit (PLC) splitter with a splitter input port (used as mux output port) and splitter output ports (used as mux input ports) on the same side or facet of the PLC splitter chip. The reversed PLC splitter has the additional advantage of being wavelength independent and thus may be less susceptible to wavelength drift (e.g., caused by temperature changes).

As shown in greater detail in FIGS. 3B and 3C, with additional reference to FIG. 3A, a fiber array holder 356 is used to hold input optical fibers 325-1 to 325-4 and output optical fiber 327 in alignment, and to optically couple the input optical fibers 325-1 to 325-4 and the optical fiber 327 to the respective mux input ports 326-1 to 326-4 and the mux output port 353 on the optical coupling side 321 of the optical multiplexer 322. In this embodiment, the fiber array holder 356 includes a base portion 352 with V-shaped grooves 359 receiving the respective optical fibers and a top portion 357 securing the fibers in the V-shaped grooves 354. The optical coupling side 321 may be angled with an angle α relative to a line perpendicular to the top and/or bottom surface of the optical multiplexer 322. The fiber array holder 356 has a corresponding angled coupling face to allow angled fiber ends to be coupled to angled mux input ports, which reduces back reflection and improves coupling efficiency. In one example, the length of the optical multiplexer 322 with the fiber array holder 356 may be less than 15 mm and more specifically about 12.2 mm and the width of the optical multiplexer 222 may be less than 5 mm and more specifically about 4 mm.

The mux input optical fibers 325-1 to 325-4 are optically coupled to a plurality of TOSA modules 324-1 to 324-4 using TOSA optical coupling assemblies 340-1 to 340-4. The TOSA modules 324-1 to 324-4 are located in another section of the housing 302 such that the optical multiplexer 322 is spaced from the TOSA modules 324-1 to 324-4 to reduce thermal effects from the heat generated by the TOSA modules 324-1 to 324-4. The TOSA optical coupling assemblies 340-1 to 340-4 may include one or more optical coupling ferrules 342-1 to 342-4 (see FIG. 3B), which are inserted into coupling receptacles extending from the TOSA modules 324-1 to 324-4 to provide optical alignment and coupling. Known optical coupling assemblies may be used such as LC/UPC coupling ferrules. The mux output port 353 of the optical multiplexer 322 is optically coupled to an output optical connector 316 using the output optical fiber 327 (see FIG. 3A). The output optical connector 316 may be a known optical connector such as an LC receptacle.

Figure 4:
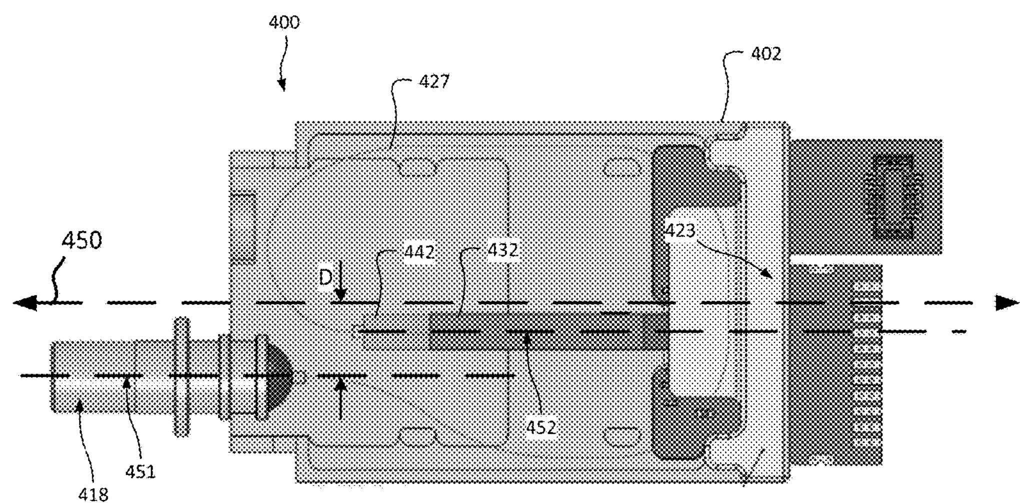
FIG. 4 is a top view of an embodiment of a receiver portion of a multi-channel transceiver including an optical input port indirectly coupled to demultiplexing device via an intermediate fiber, consistent with the present disclosure.

Referring to FIG. 4, a receiving portion of one embodiment of a multi-channel optical transceiver 400 is shown and described in greater detail. In this embodiment, an optical input port 418, e.g., an LC connector, extends substantially in parallel with a longitudinal axis 450 of the housing 402. A demultiplexing device 432 is disposed in the housing 402 adjacent a distal side 423 of the housing 402. As shown, an optical fiber 427 is disposed within the housing 402 and includes a first end coupled to the optical input port 418 and a second end optically coupled to an optical coupling receptacle/assembly 442 of the demultiplexing device 432. At a distal end of the demultiplexing device 432 relative to the optical coupling receptacle 442, the multiplexing device may be coupled to associated circuitry, e.g., a photodiode array, transimpedance amplifier (TIA), receiver circuitry, and so on. Accordingly, the end of the demultiplexer device 432 adjacent to the optical coupling receptacle 442 may be referred to as an optical coupling end, and the opposite end of the demultiplexer device 432 may be referred to as an electrical coupling end.

As shown, the optical fiber 427 is routed in a manner that provides a relatively large bending radius to advantageously reduce bending losses. This increase in bending radius may be achieved, at least in part, by the position of the multiplexing device 432 within the housing 402. Additional examples of the multiplexing device 432 and the resulting bending radius of an associated optical fiber is described in greater detail in U.S. Patent Application Publication No. 2018-0052289 (Ser. No. 15/242,005), which is commonly owned and incorporated herein by reference.

Continuing with FIG. 4, the optical coupling receptacle 442 is shown as indirectly optically coupled to the demultiplexing device 432 via optical fiber 427. In more detail, the optical center line 451 of the optical coupling receptacle 442 is laterally offset by a distance D. The distance D may measure between 2 mm and 10 mm, although other offsets are within the scope of this disclosure. This lateral offset may be function of the position of the optical input port 418 relative to the multiplexing device 432. In some cases, the position of the optical input port 418 is fixed based on a standard established for a particular form-factor and configuration, e.g., a small form-factor specification. On the other hand, the position of the demultiplexing device 432 may vary depending on a desired configuration based on the flexibility of fiber 427.

Figure 5:
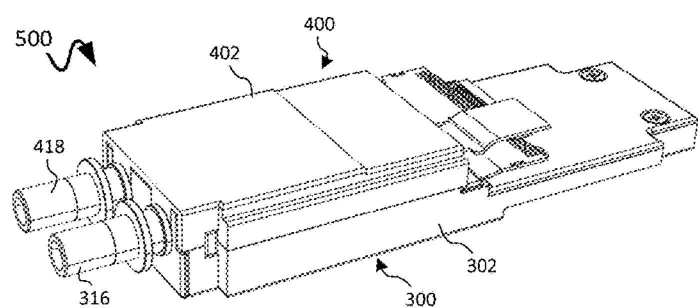
FIG. 5 is a perspective view of the transmitter and receiver portions of FIGS. 3A and 4, respectively, collectively forming an optical transceiver in accordance with an embodiment of the present disclosure.

Turning to FIG. 5, an optical transceiver module 500 having a partitioned housing is shown in accordance with an embodiment. As shown, the housing 302 of the multi-channel transceiver 300 is coupled to the housing 402 of the multi-channel ROSA 400 and collectively form the optical transceiver 500. One example of a partitioned optical transceiver housing is described in greater detail in U.S. Patent Application Publication No. 2018-0052291 (Ser. No. 15/242,017), which is commonly owned and incorporated herein by reference. The partitioned optical transceiver housing has the additional advantage of providing separate workspace for each of the TOSA and ROSA portions which reduces the potential of damaging sensitive components and overall complexity during manufacturing.

In accordance with an aspect of the present disclosure an optical transceiver is disclosed. The optical transceiver includes a housing comprising a plurality of sidewalls extending from a first end to a second end along a longitudinal axis, wherein the plurality of sidewalls define a cavity having a first longitudinal center line, an optical multiplexing device at least partially disposed within the cavity and having an input port with a first optical center line, a first optical coupling port at this first end of the housing, the optical coupling port having a second optical center line, a first optical fiber having a first end optically coupled to the optical coupling port and a second end optically coupled to the multiplexing device, and wherein the first optical center line of the input of the multiplexing device is laterally offset by a distance D from the second optical center line of the optical coupling port.

In accordance with another aspect of the present disclosure a multi-channel optical transceiver is disclosed. The multi-channel optical transceiver including a transmitter housing, a plurality of transmitter optical subassembly (TOSA) modules located in the transmitter housing for transmitting a plurality of optical signals at different respective channel wavelengths, an optical output port disposed at end of the transmitter housing for optically coupling to an external fiber, and an optical multiplexer located at a distal end of the transmitter housing and optically coupled to the TOSA modules for multiplexing the plurality of optical signals into a multiplexed optical signal including the different channel wavelengths, wherein the optical multiplexer includes a plurality of mux input ports optically coupled to the respective TOSA modules with input optical fibers for receiving the respective optical signals and a mux output port optically coupled to the optical output port, wherein the mux output port is optically coupled to the optical output port via an intermediate optical fiber.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical transceiver comprising:

a first housing portion comprising a plurality of sidewalls extending from a first end to a second end along a first longitudinal axis, wherein the plurality of sidewalls define a first cavity having a first longitudinal center line, the first cavity for receiving one of a transmitter optical subassembly (TOSA) or receiver optical subassembly (ROSA);

a second housing portion for coupling to the first housing portion, the second housing portion comprising a plurality of sidewalls extending from a first end to a second end along a second longitudinal axis, wherein the plurality of sidewalls define a second cavity for receiving the other of the TOSA or ROSA;

an optical multiplexing device at least partially disposed within the first cavity and having an input port with a first optical center line, wherein the optical multiplexing device includes a plurality of input ports to receive channel wavelengths from associated laser assemblies and an output port to output a signal having multiple channel wavelengths, wherein the plurality of input ports and the output port are located on one side of the optical multiplexing device;

a first optical coupling port at the first end of the first housing portion, the optical coupling port having a second optical center line;

a first optical fiber having a first end optically coupled to the optical coupling port and a second end optically coupled to the multiplexing device; and wherein the first optical center line of the input of the multiplexing device is laterally offset by a distance D from the second optical center line of the optical coupling port.

2. The optical transceiver of claim 1, wherein the optical multiplexing device abuts a distal end wall of the first housing portion relative to the first optical coupling port.

3. The optical transceiver of claim 1, wherein the first housing portion comprises a transmitter optical subassembly (TOSA) module, and wherein the optical multiplexing device comprises a planar lightwave circuit (PLC) splitter.

4. The optical transceiver of claim 3, wherein the optical multiplexing device includes a reversed planar lightwave circuit (PLC) splitter, and wherein the first optical fiber is optically coupled to the output port.

5. The optical transceiver of claim 4, further comprising a plurality of laser assemblies disposed in the first housing portion, each of the plurality of laser assemblies configured to output a different channel wavelength, and wherein each of the laser assemblies is optically coupled to a respective port of the plurality of input ports through an optical fiber.

6. The optical transceiver of claim 1, wherein the optical multiplexing device comprises an arrayed waveguide grating (AWG) device.

7. The optical transceiver of claim 1, further comprising a plurality of transmitter optical subassembly (TOSA) modules disposed in the second cavity of the second housing portion.

8. The optical transceiver of claim 1, wherein the first optical fiber includes one or more bends to route the first optical fiber between the first optical coupling port and the optical multiplexing device.

9. The optical transceiver of claim 1, wherein the lateral offset D measures at least 2 millimeters.

10. The optical transceiver of claim 1, wherein the transceiver is a Small Form-factor Pluggable (SFP) transceiver module.

11. A multi-channel optical transceiver comprising:

a transmitter housing;

a plurality of transmitter optical subassembly (TOSA) modules located in the transmitter housing for transmitting a plurality of optical signals at different respective channel wavelengths;

an optical output port disposed at an end of the transmitter housing for optically coupling to an external fiber; and an optical multiplexer located at a distal end of the transmitter housing and optically coupled to the TOSA modules for multiplexing the plurality of optical signals into a multiplexed optical signal including the different channel wavelengths, wherein the optical multiplexer includes a plurality of mux input ports optically coupled to the respective TOSA modules with input optical fibers for receiving the respective optical signals and a mux output port optically coupled to the optical output port, and wherein the mux output port is optically coupled to the optical output port via an intermediate optical fiber.

12. The multi-channel optical transceiver of claim 11, wherein the optical output port has a first optical center line and the mux output port has a second optical center line, and wherein the first optical center line is not coaxially aligned with the second optical center line.

13. The multi-channel optical transceiver of claim 11, the optical multiplexer comprises a planar lightwave circuit (PLC) splitter.

14. The multi-channel optical transceiver of claim 11, wherein the intermediate optical fiber includes one or more bends to route the first optical fiber between the first optical coupling port and the optical multiplexing device.

15. The multi-channel optical transceiver of claim 11, wherein the transceiver is a Small Form-factor Pluggable (SFP) transceiver module.

16. The optical transceiver of claim 1, further comprising a second optical coupling port at the first end of the second housing portion.

17. The optical transceiver of claim 1, wherein the first optical fiber is disposed at least partially within the first cavity of the first housing portion.

18. The optical transceiver of claim 1, wherein the optical multiplexer is located at a distal end of the transmitter housing.

19. The multi-channel optical transceiver of claim 11, wherein the plurality of mux input ports and the mux output port are located on one side of the optical multiplexer facing away from the distal end of the transmitter housing.

* * * * *